United States Patent
Nakajima et al.

(10) Patent No.: US 7,068,314 B1
(45) Date of Patent: Jun. 27, 2006

(54) IMAGE PICKUP APPARATUS WHICH CAN ELIMINATE A FALSE COLOR IN THE SPATIAL FREQUENCY BAND DURING CHROMATIC SIGNAL PROCESSING

(75) Inventors: Takayuki Nakajima, Kanagawa (JP); Hideo Takechi, Tokyo (JP)

(73) Assignee: Sony Corporation, Tokyo (JP)

( * ) Notice: Subject to any disclaimer, the term of this patent is extended or adjusted under 35 U.S.C. 154(b) by 859 days.

(21) Appl. No.: 09/658,046

(22) Filed: Sep. 8, 2000

(30) Foreign Application Priority Data

Sep. 10, 1999 (JP) ............................... P11-258101

(51) Int. Cl.
*H04N 5/335* (2006.01)
(52) U.S. Cl. ................................................... 348/273
(58) Field of Classification Search ................ 348/503, 348/273
See application file for complete search history.

(56) References Cited

U.S. PATENT DOCUMENTS

| | | | | |
|---|---|---|---|---|
| 5,331,346 A | * | 7/1994 | Shields et al. | 348/441 |
| 5,552,827 A | * | 9/1996 | Maenaka et al. | 348/266 |
| 5,719,633 A | * | 2/1998 | Nishio et al. | 348/441 |
| 5,748,307 A | * | 5/1998 | Nakamura et al. | 358/296 |
| 6,018,363 A | * | 1/2000 | Horii | 348/219.1 |
| 6,124,888 A | * | 9/2000 | Terada et al. | 348/302 |
| 6,133,953 A | * | 10/2000 | Okada | 348/272 |
| 6,163,342 A | * | 12/2000 | Suzuki | 348/364 |
| 6,256,068 B1 | * | 7/2001 | Takada et al. | 348/441 |
| 6,272,260 B1 | * | 8/2001 | Furukawa et al. | 382/261 |
| 6,433,828 B1 | * | 8/2002 | Kondo et al. | 348/458 |

FOREIGN PATENT DOCUMENTS

| | | |
|---|---|---|
| EP | 0 800 317 | 10/1997 |
| EP | 0 861 005 | 8/1998 |

* cited by examiner

*Primary Examiner*—David Ometz
*Assistant Examiner*—James M. Hannett
(74) *Attorney, Agent, or Firm*—Frommer Lawrence & Haug LLP; William S. Frommer; Thomas F. Presson

(57) ABSTRACT

A system according to the present invention reads image pickup signals for all lines from a CCD image sensor and inputs these signals to a delay circuit 20. The system retrieves signals [H0D] to [H5D] for six contiguous lines and sends these signals to a vertical spatial phase synchronization filter 37 via a horizontal spatial phase synchronization filter 36. These filters 36 and 37 synchronize horizontal and vertical spatial phases. The system performs the following operations on the basis of Cy (cyan), Ye (yellow), G (green), and Mg (magenta) in each pixel data for the signal whose horizontal and vertical phases are synchronized.

$S1r=Cy+G, S2r=Ye+Mg$ $S1b=Cy+Mg, S2b=Ye+G$

These operations create new signals $S1r$, $S2r$, $S1b$, and $S2b$ which are then sent to a C process circuit 60.

10 Claims, 10 Drawing Sheets

|     |      |      |      |      |      |      |
| --- | ---- | ---- | ---- | ---- | ---- | ---- |
| N0  | Cy00 | Ye01 | Cy02 | Ye03 | Cy04 | Ye05 |
| N1  | G10  | Mg11 | G12  | Mg13 | G14  | Mg15 |
| N2  | Cy20 | Ye21 | Cy22 | Ye23 | Cy24 | Ye25 |
| N3  | Mg30 | G31  | Mg32 | G33  | Mg34 | G35  |
| N4  | Cy40 | Ye41 | Cy42 | Ye43 | Cy44 | Ye45 |
| N5  | G50  | Mg51 | G52  | Mg53 | G54  | Mg55 |

FIG.1

|    |       |       |       |       |       |       |
|----|-------|-------|-------|-------|-------|-------|
| N0 | Cy00  | Ye01  | Cy02  | Ye03  | Cy04  | Ye05  |
| N1 | G10   | Mg11  | G12   | Mg13  | G14   | Mg15  |
| N2 | Cy20  | Ye21  | Cy22  | Ye23  | Cy24  | Ye25  |
| N3 | Mg30  | G31   | Mg32  | G33   | Mg34  | G35   |
| N4 | Cy40  | Ye41  | Cy42  | Ye43  | Cy44  | Ye45  |
| N5 | G50   | Mg51  | G52   | Mg53  | G54   | Mg55  |

FIG.3

|   | S1r | S2r | S1r | S2r | S1r | S2r |
|---|---|---|---|---|---|---|
| N0+N1 | Cy00 +G10 | Ye01 +Mg11 | Cy02 +G12 | Ye03 +Mg13 | Cy04 +G14 | Ye05 +Mg15 |

|   | S1b | S2b | S1b | S2b | S1b | S2b |
|---|---|---|---|---|---|---|
| N2+N3 | Cy20 +Mg30 | Ye21 +G31 | Cy22 +Mg32 | Ye23 +G33 | Cy24 +Mg34 | Ye25 +G35 |

|   | S1r | S2r | S1r | S2r | S1r | S2r |
|---|---|---|---|---|---|---|
| N4+N5 | Cy40 +G50 | Ye41 +Mg51 | Cy42 +G52 | Ye43 +Mg53 | Cy44 +G54 | Ye45 +Mg55 |

FIG.4

|    |       |       |       |       |       |       |
|----|-------|-------|-------|-------|-------|-------|
| N0 | Cy00  | Ye01  | Cy02  | Ye03  | Cy04  | Ye05  |
| N1 | G10   | Mg11  | G12   | Mg13  | G14   | Mg15  |
| N2 | Cy20  | Ye21  | Cy22  | Ye23  | Cy24  | Ye25  |
| N3 | Mg30  | G31   | Mg32  | G33   | Mg34  | G35   |
| N4 | Cy40  | Ye41  | Cy42  | Ye43  | Cy44  | Ye45  |
| N5 | G50   | Mg51  | G52   | Mg53  | G54   | Mg55  |

FIG.8

IMAGE PICKUP APPARATUS WHICH CAN ELIMINATE A FALSE COLOR IN THE SPATIAL FREQUENCY BAND DURING CHROMATIC SIGNAL PROCESSING

BACKGROUND OF THE INVENTION

1. Technical Field

The present invention relates to an image pickup apparatus. More particularly, the present invention relates to an image pickup apparatus which is applied to a video camera using a complementary mosaic color coding CCD.

2. Prior Art

A single-board CCD color camera system or the like captures color images by using a single solid-state image pickup element such as a CCD image sensor. Such a system needs to provide each pixel with a different color filter namely a color coding filter on the CCD image sensor as an image pickup element.

FIG. 1 shows an example of a color array structure used for the complementary mosaic color coding filter as an example of a color coding filter. In this figure, Cy stands for cyan, Ye for yellow, G for green, and Mg for magenta. There are lines N0 to N5. The ith line is indicated as Ni ($0 \leq i$). Each pixel is expressed as the jth pixel ($0 \leq j$). According to this convention, Xij means color X for the jth pixel on line Ni. For example, G12 means color G (green) for the second pixel on line N1. An example in FIG. 3 shows that colors are repeated horizontally at a 2-pixel interval such as Cy, Ye, Cy, Ye, and so on. Colors are repeated vertically at a 4-pixel (4-line) interval such as Cy, G, Cy, Mg, and so on. Namely, this example uses a 2-pixel interval for horizontal repetition and a 4-line interval for vertical repetition.

FIG. 2 is a block diagram of a camera signal processing system for a video camera apparatus as an image pickup apparatus. This system is provided with a CCD image sensor 102 which uses such a complementary mosaic color coding filter as illustrated in FIG. 1 or 3.

In FIG. 2, an image pickup signal from an optical system 101 is sensed in a CCD image sensor 102 and is sent to a delay circuit 120 via a front end circuit 103. The optical system 101 comprises a camera lens, a mechanical shutter, and the like. The CCD image sensor 102 functions as an image pickup element. The front end circuit 103 comprises a CDS (correlation double sampling) circuit, a GCA (gain control amplifier), an A/D (analog/digital) converter, and the like. The CCD image sensor 102 is supplied with a pulse signal read from a timing generator 106. The front end circuit 103 is supplied with a sampling pulse, an A/D converter drive pulse, and the like from the timing generator 106. The timing generator 106 is supplied with a control signal from a system control circuit 107. The delay circuit 120 is also supplied with a control signal from the system control circuit 107. An output signal from the delay circuit 120 is sent to a Y (brightness) process circuit 140 and a C (chromaticness) process circuit 160 via a preprocessing circuit 130. The Y process circuit 140 and the C process circuit 160 are also provided with a control signal from the system control circuit 107.

The system in FIG. 2 reads fields from the interlaced scanning CCD. As shown in FIG. 3, the system adds vertically adjacent pixel data to each other on every two lines in the CCD. The system reads this data in the form of a signal as illustrated in FIG. 4. This operation is called 2-line mixed reading. When the system reads every two lines N0+N1, N2+N3, and so on for one field by mixing and adding, the system then reads every two lines N1+N2, N3+N4, and so on for the next field by mixing and adding. For each pixel to be mixed and added, Cy+G is expressed as S1r, Ye+Mg as S2r, Cy+Mg as S1b, and Ye+G as S2b.

FIG. 5 shows chromaticness signal processing including the C process circuit 160 in FIG. 2 and peripheral circuits. In FIG. 5, the delay circuit 120 retrieves a no-delay signal [HH0D], a 1H delay signal [HH1D], and a 2H delay signal [HH2D] using two 1H (one horizontal interval or one line) delay devices 121 and 122. The delay circuit then sends these signals to the preprocessing circuit 130. In the preprocessing circuit 130, an adder 131 adds the above-mentioned signals [HH0D] to [HH2D]. A ½ multiplier 132 halves these signals like ([HH0D]+[HH2D])/2 and sends the processed signal to the C process circuit 160. The delay circuit sends the 1H delay signal [HH1D] unmodified to the C process circuit 160. This signal is used for processing. In the C process circuit 160, the 1H delay signal [HH1D] and the signal ([HH0D]+[HH2D])/2 are sent to the postprocessing circuit 162 via a horizontal spatial phase synchronization filter 161. An output is retrieved from the postprocessing circuit 162. The horizontal spatial phase synchronization filter 161 uses the tap factor (1,0,3)/(3,0,1) for a filter operation. With respect to a signal for lines N2+N3 in FIG. 4, a filter operation using tap factors (1,0,3) signifies multiplying Cy20+Mg30 by the weight 1 and multiplying Cy22+Mg32 by the weight 3. (Additionally, there may be normalization through the use of division by a sum of factors.) Such a filter operation synchronizes horizontal spatial phases.

During the chromaticness signal processing in FIG. 5, delay lines of the delay circuit 120 synchronize vertical spatial phases for the signal [HH1D] and the signal ([HH0D]+[HH2D])/2. The horizontal spatial phase synchronization filter 161 synchronizes a horizontal spatial phase for each of these signals as S1 and S2. The postprocessmg circuit 162 generates a chromaticness signal by processing signals S1r, S2r, S1b, and S2b whose vertical and horizontal spatial phases are synchronized.

The above-mentioned signals [HH1D] and ([HH0D]+[HH2D])/2 are expressed as follows with regard to pixel rates for the CCD image sensor 102.

$$[HH1D]=N2+N3$$

$$([HH0D]+[HH2D])/2=((N0+N1)+(N4+N5))/2$$

A chromaticness signal is created at the CCD pixel rate based on data for six lines N0 to N5 in a vertical direction. Namely, the following filter operation is performed in a vertical direction according to filter tap factors.

(0,0,2,2,0,0)/(1,1,0,0,1,1)

A camera signal processing system according to the conventional field reading causes a problem during chromaticness processing. Specifically, given that "fsv" signifies a sampling frequency for the CCD pixel rate in a vertical direction, the above-mentioned filtering in the vertical direction causes a problem of generating a false color at (¼) fsv in the spatial frequency band.

BRIEF SUMMARY OF THE INVENTION

The present invention has been made in consideration of the foregoing. It is therefore an object of the present invention to provide an image pickup apparatus which can eliminate a false color at (¼) fsv in the spatial frequency band during chromaticness signal processing.

For the purpose of solving the above-mentioned problem, an image pickup apparatus according to the present invention comprises: an image pickup element having a color coding filter; spatial phase synchronization means for synchronizing spatial phases in horizontal and vertical directions based on output from each line in the image pickup element; and synthesis means for generating a synthesized signal based on a signal from the spatial phase synchronization means, wherein this signal has a spatial phase synchronized horizontally and vertically. The image pickup apparatus according to the present invention processes chromaticness of signals from this synthesis means.

The color coding filter is a complementary mosaic color coding filter. This complementary mosaic color coding filter comprises: a first line which is an alternate repetition of Cy and Ye; a second line which is an alternate repetition of G and Mg; a third line which is an alternate repetition of Cy and Ye; and a fourth line which is an alternate repetition of Mg and G. The complementary mosaic color coding filter is based on a repetition of two pixels horizontally by four lines vertically.

The spatial phase synchronization means generates a signal whose horizontal and vertical phases are synchronized. The synthesis means performs the following operations based on Cy (cyan), Ye (yellow), G (green), and Mg (magenta) in each pixel data for that signal.

$$S1r=Cy+G, \ S2r=Ye+Mg$$

$$S1b=Cy+Mg, \ S2b=Ye+G$$

These operations create new signals $S1r$, $S2r$, $S1b$, and $S2b$.

An image pickup apparatus according to the present invention comprises: an image pickup element having a color coding filter; spatial phase synchronization means for synchronizing horizontal and vertical spatial phases based on output from each line in the image pickup element; and synthesis means for generating a synthesized signal based on a signal from the spatial phase synchronization means, wherein this signal has a spatial phase synchronized horizontally and vertically. The image pickup apparatus according to the present invention can eliminate a false signal at (¼) fsv in a chromaticness signal and greatly improve images by processing chromaticness of signals from this synthesis means.

BRIEF DESCRIPTION OF THE SEVERAL VIEWS OF THE DRAWINGS

FIG. 1 shows an example of a complementary mosaic color coding filter on a CCD image sensor;

FIG. 3 illustrates 2-line mixed reading for the CCD image sensor;

FIG. 4 illustrates a CCD output signal generated by 2-line mixed reading of the CCD image sensor;

FIG. 8 illustrates frame reading on the CCD image sensor;

DETAILED DESCRIPTION OF THE INVENTION

Figure 2:
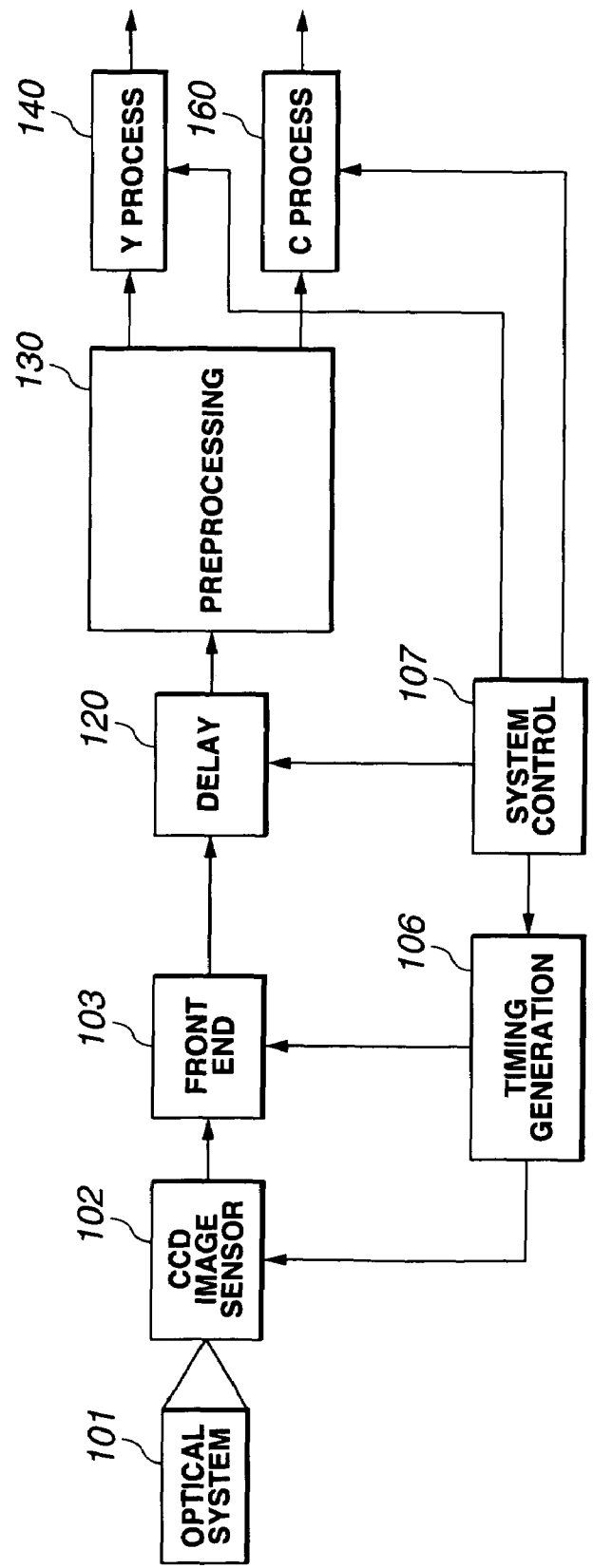
FIG. 2 is a block diagram showing an example of a camera signal processing system for a conventional video camera apparatus.
Figure 5:
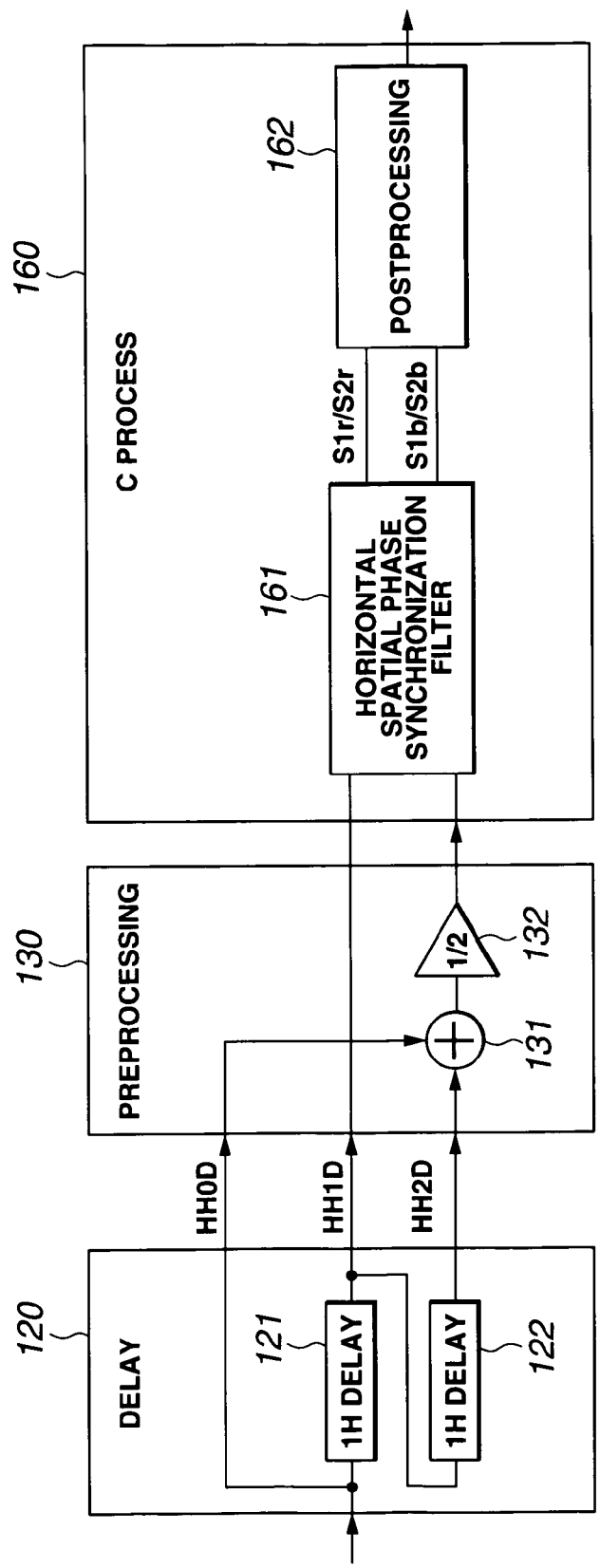
FIG. 5 is a block diagram showing part of a configuration associated with the conventional chromaticness signal processing.
Figure 6:
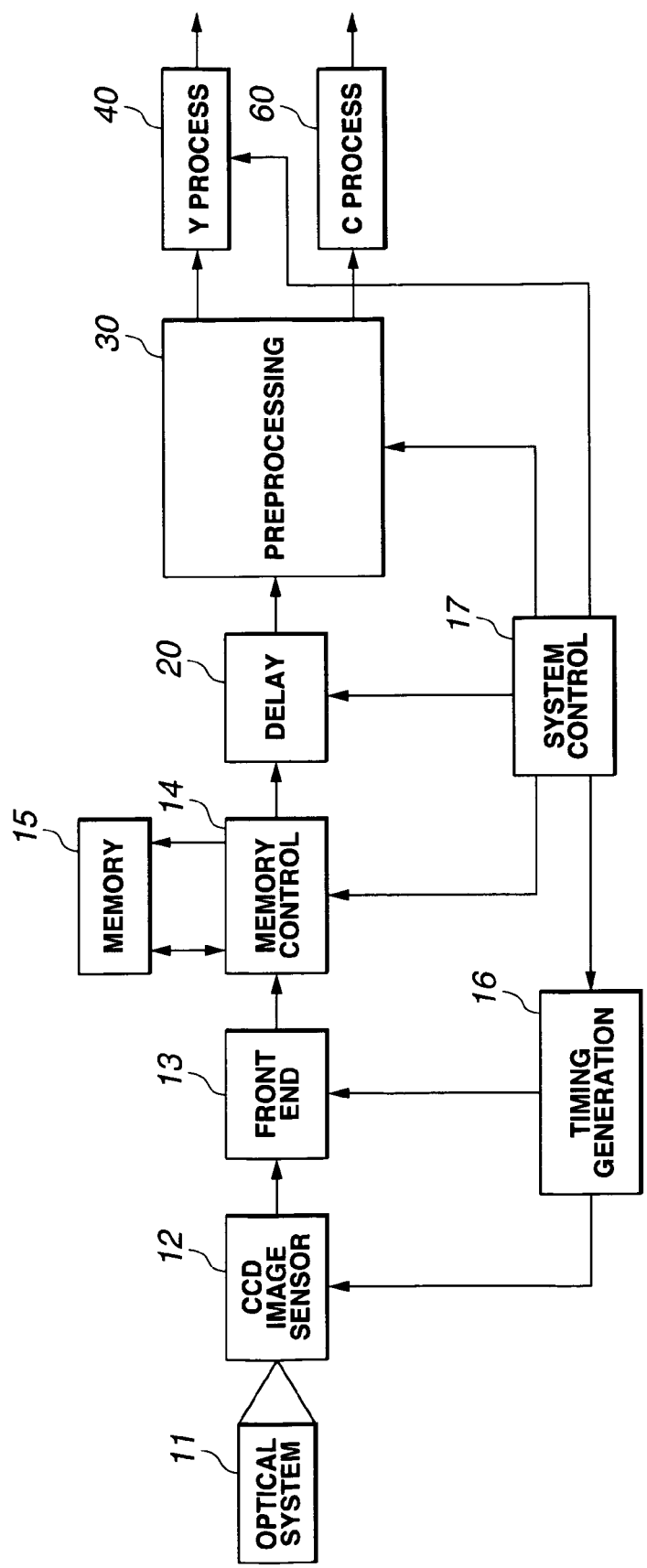
FIG. 6 is a block diagram showing a configuration of a video camera apparatus to which an embodiment of the present invention is applied.
Figure 7:
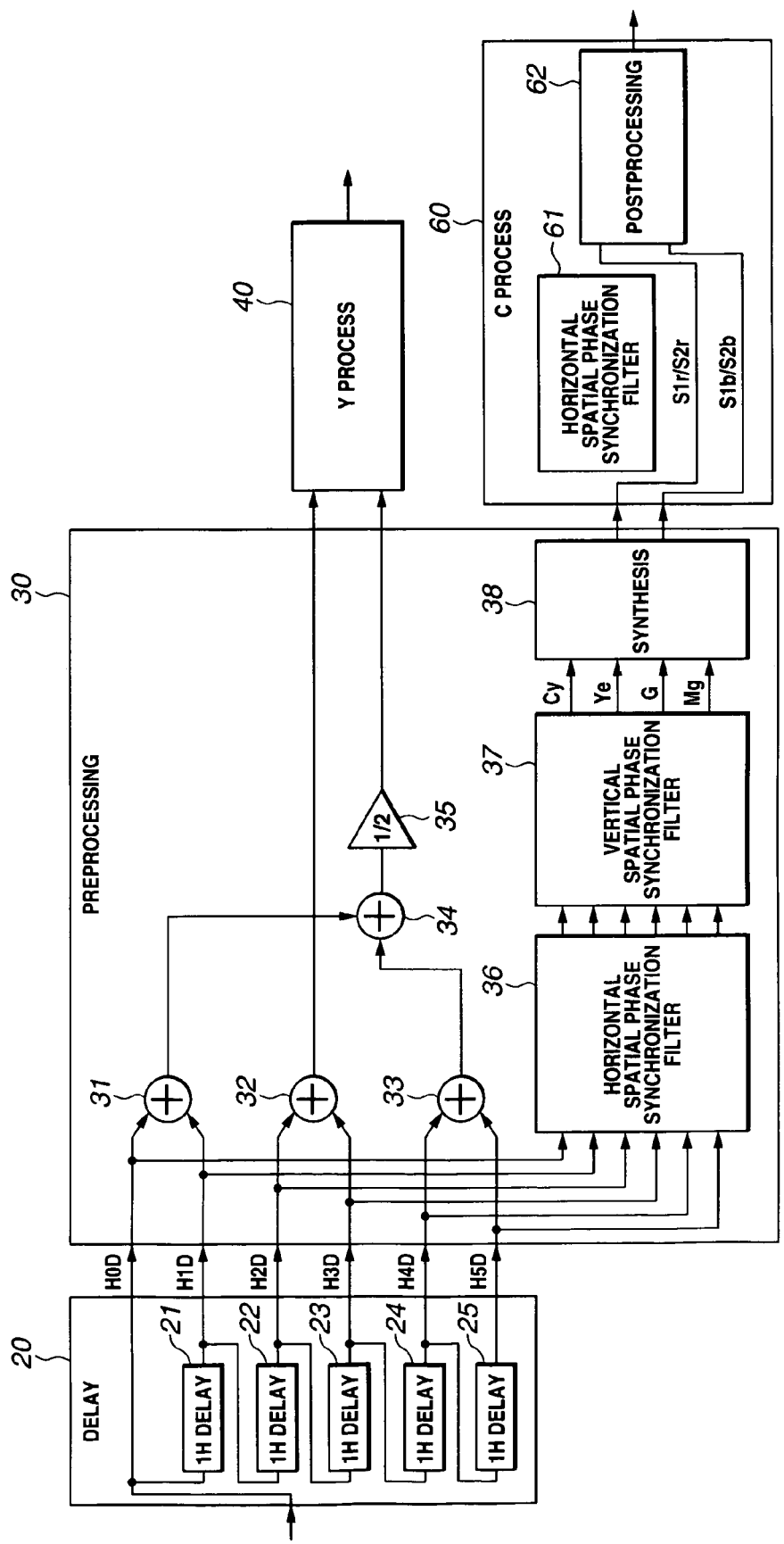
FIG. 7 is a block diagram showing part of a configuration associated with the chromaticness signal processing which is a major function for an embodiment of the present invention.

Embodiments of an image pickup apparatus according to the present invention will be described in detail, with reference to the accompanying drawings. FIG. 6 is a block diagram showing a system configuration of a video camera apparatus as the embodiment of an image pickup apparatus according to the present invention. FIG. 7 is a block diagram showing part of a configuration associated with the chromaticness signal processing which is a major function for the embodiment of the present invention.

In FIG. 6, an optical system 11 in a camera comprises a lens, a mechanical shutter, and the like. A CCD image sensor 12, functioning as an image pickup element, picks up and photoelectrically converts an optical image from the optical system 11. The CCD image sensor 12 can read all pixels. More specifically, all pixels are read on a frame basis in an interlaced scanning CCD. The interlaced scanning and frame reading generates a 2-field signal. This signal corresponds to an image which is exposed at the same time by the mechanical shutter in the optical system 11.

An image pickup signal generated from the CCD image sensor 12 is supplied to a front end circuit 13. The front end circuit 13 comprises a CDS (correlation double sampling) circuit, a GCA (gain control amplifier), an A/D (analog/digital) converter, and the like for detecting each pixel's electric charge which is photoelectrically converted and stored in the CCD. An output signal from the front end circuit 13 is sent to a delay circuit 20 via a memory control circuit 14. Memory 15 is connected to the memory control circuit 14. The memory 15 is used for rearranging the frame-read signal from the CCD image sensor 12 according to spatial array data on the CCD.

The CCD image sensor 12 is supplied with a read pulse signal from a timing generator 16. The front end circuit 13 is supplied with a sampling pulse, an A/D converter drive pulse, and the like from the timing generator 16. The timing generator 16 is supplied with a control signal from a system control circuit 17. A delay circuit 120 is also supplied with a control signal from the system control circuit 17.

Figure 9:
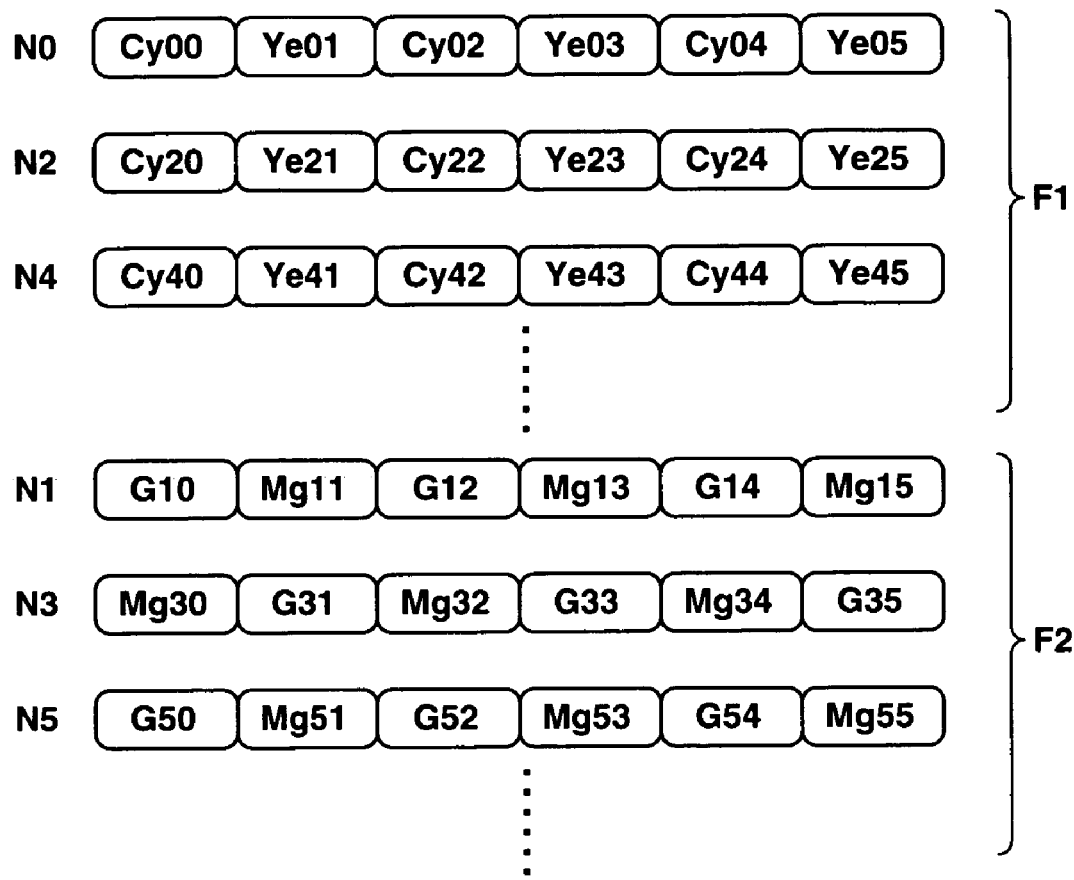
FIG. 9 illustrates a CCD output signal when two field signals are used to read all pixels from the CCD image sensor by interlaced scanning.
Figure 10:
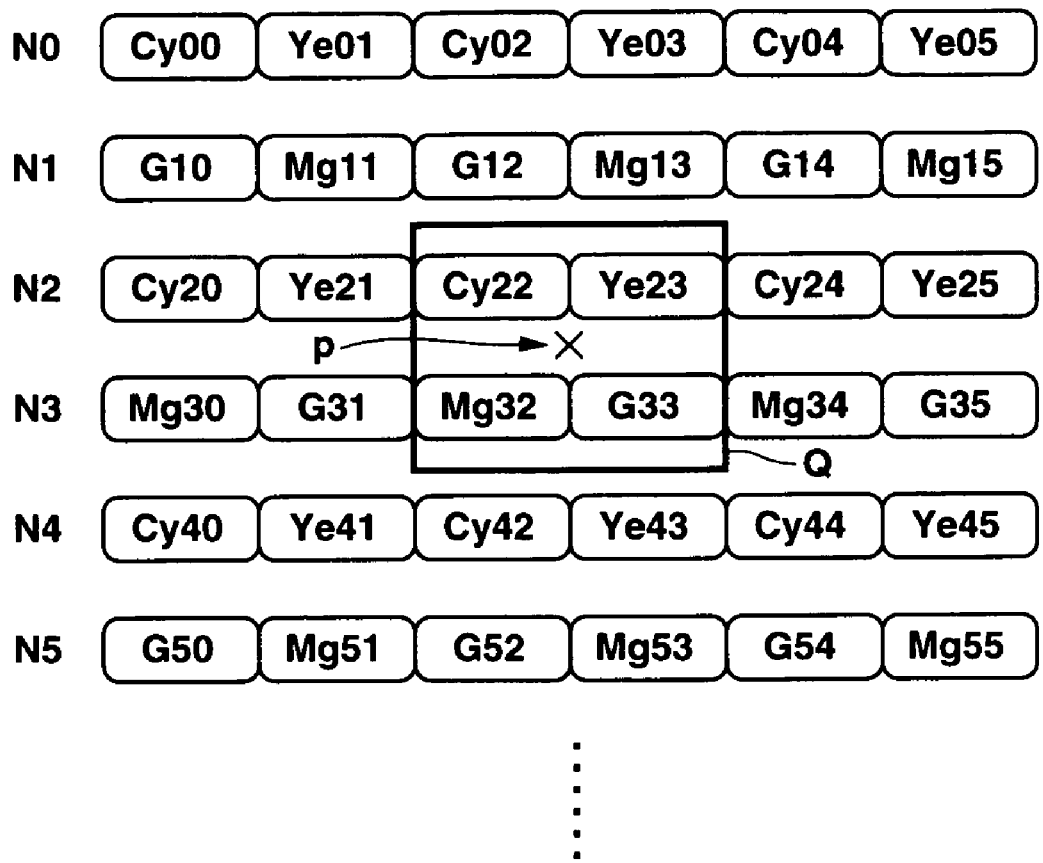
FIG. 10 illustrates a signal after rearrangement according to a pixel array on the CCD image sensor with reference to the CCD output signaling FIG. 9.

The following describes the frame read operation from the CCD image sensor 12 and the rearrangement in the memory 15 with reference to FIGS. 8 to 10. FIG. 8 illustrates frame reading on the CCD image sensor 12. This operation reads all pixels on all lines N0 to N5. Since interlaced scanning is performed every other line, a CCD output signal is read as a 2-field signal as shown in FIG. 9. This signal comprises a first field F1 for even-numbered lines N0, N2, and N4, and a second field F2 for odd-numbered lines N1, N3, and N5. The memory control circuit 14 controls to write or read a signal for two fields F1 and F2 from memory 15. As shown in FIG. 10, this signal is arranged for output in the order of spatial arrays on the CCD. The output signal from the memory control circuit 14 in FIG. 10 becomes a frame image signal which follows the order of lines N0 to N5 on the CCD.

Again in FIG. 6, an output signal from the delay circuit 20 is sent to a Y (brightness) process circuit 40 and a C (chromaticness) process circuit 60 via a preprocessing circuit 30. A control signal from the system control circuit 17 is also supplied to the Y process circuit 40 and the C process circuit 60.

FIG. 7 shows part of a configuration associated with the chromaticness signal processing which is a major function for the embodiment of the present invention. In this FIG. 7, the delay circuit 20 retrieves a no-delay signal [H0D] and 1H delay signal [H1D] to 5H delay signal [H5D], and sends these signals to a preprocessing circuit 30 using five 1H (one horizontal interval or one line) delay devices 21 to 25. With regard to correspondence among these signals [H0D] to [H5D] and lines N0 to N5 in FIG. 10, for example, the no-delay signal [H0D] corresponds to line N5. The 1H delay signal [H1D], the 2H delay signal [H2D], . . . and the 5H delay signal [H5D] correspond to the line N4, the line N3, . . . and the line N0, respectively.

In the preprocessing circuit 30, the signals [H0D] to [H5D] are added as follows. An adder 31 adds signals [H0D] to [H1D]. An adder 32 adds signals [H2D] to [H3D]. An adder 33 adds signals [H4D] to [H5D]. An adder 34 adds output from the adder 31 to output from the adder 33. A ½ multiplier 35 halves output from the adder 34. The preprocessing circuit 30 sends an output signal ([H0D]+[H1D]+[H4D]+[H5D])/2 from the multiplier 35 and an output signal ([H2D]+[H3D]) from the adder 32 to a Y process circuit 40. An output signal ([H2D]+[H3D]) from the adder 32 is to be processed currently. The signals [H0D] to [H5D] are sent to a synthesizer circuit 38 via a horizontal spatial phase synchronization filter 36 and a vertical spatial phase synchronization filter 37. Signals S1$r$/S2$r$ and S1$b$/S2$b$ from the synthesizer circuit 38 are sent to a C process circuit 60. The horizontal spatial phase synchronization filter 36 uses the following tap factors for filter operations.

(1,0,3)/(3,0,1)

The vertical spatial phase synchronization filter 37 uses the following tap factors for filter operations.

(1,0,4,0,3,0)/(0,3,0,4,0,1)

Synthesis processing in the synthesizer circuit 38 means creating signals S1$r$, S2$r$, S1$b$, and S2$b$ based on complementary data (Cy, Ye, G, Mg) whose horizontal and vertical spatial phases are synchronized. The signals S1$r$, S2$r$, S1$b$, and S2$b$ are expressed as follows.

$S1r=Cy+G, S2r=Ye+Mg$ $S1b=Cy+Mg, S2b=Ye+G$

The process circuit 60 directly sends signals S1$r$/S2$r$ and S1$b$/S2$b$ from the synthesizer circuit 38 to a postprocessing circuit 62, thereby bypassing a horizontal spatial phase synchronization filter 61. This is because the preprocessing circuit 30 already synchronizes horizontal spatial phases, eliminating the need for processing by a horizontal spatial phase synchronization filter 61 in the existing C process circuit 60.

The following describes in more detail operations in the preprocessing circuit 30 which provides a main function for chromaticness signal processing according to this configuration. The horizontal spatial phase synchronization filter 36 and the vertical spatial phase synchronization filter 37 synchronize spatial phases as follows. For example, a signal is formatted according to a pixel array on the CCD as shown in FIG. 10. This example shows that a region Q contains four pixels Cy22, Ye23, Mg32, and G33. Point p is a center for these pixels. An interpolation operation is performed to find data (pixel values) for these complementary colors Cy, Ye, Mg, and G instead of these pixels Cy22, Ye23, Mg32, and G33.

In order to explain the example, it is assumed that Vp is a vertical spatial phase and Hp is a horizontal spatial phase of the point p for synchronizing the spatial phases. Each pixel has a subscript such as say "23" in Ye23. In this example, "2" represents a vertical phase and "3" represents a horizontal phase. Each pixel data at the point p can be expressed as CyVpHp, YeVpHp, MgVpHp, and GVpHp. The example in FIG. 10 assumes Vp=2.5 and Hp=2.5. As an example, the following describes how to find CyVpHp using an interpolation or filter operation. In this case, the horizontal spatial phase synchronization filter 36 is first used to find pixel data Cy0Hp, Cy2Hp, and Cy4Hp having the horizontal phase Hp=2.5. These pixel data can be found by performing the following filter operations using tap factors (3, 0, 1).

$Cy0Hp=3*Cy02+0*Ye03+1*Cy04$ $Cy2Hp=3*Cy22+0*Ye23+1*Cy24$ $Cy4Hp=3*Cy42+0*Ye43+1*Cy44$

Generally, operations with tap factor 0 are omitted as follows.

$Cy0Hp=3*Cy02+1*Cy04$ $Cy2Hp=3*Cy22+1*Cy24$ $Cy4Hp=3*Cy42+1*Cy44$

The same applies to the following description. The horizontal spatial phase synchronization filter 36 uses the same tap factors (3, 0, 1) for Mg. However, tap factors (1, 0, 3) are used for Ye and G.

As mentioned above, the horizontal spatial phase synchronization filter 36 synchronizes horizontal spatial phases in pixel data such as Cy0Hp, Cy2Hp, and Cy4Hp.

This pixel data is sent to the vertical spatial phase synchronization filter 37 which then synchronizes vertical spatial phases in the pixel data.

The following filter operation uses tap factors (1, 0, 4, 0, 3, 0) to find pixel data having the vertical phase Vp=2.5 such as CyVpHp.

$CyVpHp=1*Cy0Hp+4*Cy2Hp+3*Cy4Hp$

The tap factors (1, 0, 4, 0, 3, 0) are used for finding YeVpHp. However, the tap factors (0, 3, 0, 4, 0, 1) are used for finding MgVpHp and GVpHp.

As mentioned above, horizontal and vertical spatial phases are synchronized for pixel data CyVpHp, YeVpHp, MgVpHp, and GVpHp. The synthesizer circuit 38 then performs the following operations using data for these complementary colors Cy, Ye, Mg, and G of the pixel data.

$S1r=Cy+G, S2r=Ye+Mg$ $S1b=Cy+Mg, S2b=Ye+G$

These operations create signals S1$r$, S2$r$, S1$b$, and S2$b$. These signals are sent to the postprocessing circuit 62 in the C process circuit 60.

Signals S1$r$, S2$r$, S1$b$, and S2$b$ from the synthesizer circuit 38 are created according to an array of 2×2 pixels on the CCD. Given that "fsv" signifies a sampling frequency in the vertical direction, no false color occurs at (¼) fsv.

The present invention is not limited to the above-mentioned embodiment. While the embodiment describes an application to the video camera apparatus, the present invention can be applied to other image pickup apparatuses. While the embodiment explains signal processing by means of a frame read operation using the interlaced scanning CCD, the present invention can be applied to a system which can read data for each discrete line in a complementary mosaic color coding CCD. The pixel array for complementary mosaic color coding is not limited to the embodiment. Other arrays are also available. The present invention can be applied to the use of a color coding filter for three primary colors. It is further understood by those skilled in the art that various changes and modifications may be made in the invention without departing from the spirit and scope thereof.

What is claimed is:

1. An image pickup apparatus comprising:
   an image pickup element having a color coding filter;
   a preprocessing circuit comprising (i) means for generating signals based on output from each line in the image pickup element and for outputting the same; (ii) spatial phase synchronization means for synchronizing horizontal and vertical spatial phases based on the output from each line in the image pickup element; and (iii) synthesis means for generating a synthesized signal based on a signal whose horizontal and vertical spatial phases are synchronized in the spatial phase synchronization means;
   a brightness processing circuit which receives the outputted signals from the means for generating signals and performs brightness processing thereon; and
   a chromatic processing circuit which receives the synthesized signal from the synthesis means and performs color processing thereon,
      wherein said outputted signals are delay signals sent to said preprocessing circuit containing a plurality of adders which compiles a sum of said delay signals and a ½ multiplier which halves the sum compiled from said plurality of adders,
      wherein said preprocessing circuit outputs said sum halved by said ½ multiplier to said brightness processing circuit, and
      wherein said preprocessing circuit sends said delay signals as the synthesized signal from the synthesis means to said chromatic processing circuit.

2. An image pickup apparatus according to claim 1, wherein the color coding filter is a complementary mosaic color coding filter.

3. An image pickup apparatus according to claim 2, wherein the complementary mosaic color coding filter is based on a repetition of two pixels horizontally by four lines vertically, and wherein the filter comprises:
   a first line which is an alternate repetition of Cy (cyan) and Ye (yellow);
   a second line which is an alternate repetition of G (green) and Mg (magenta);
   a third line which is an alternate repetition of Cy and Ye; and
   a fourth line which is an alternate repetition of Mg and G.

4. An image pickup apparatus according to claim 2, wherein the synthesis means generates new signals $S1r$, $S2r$, $S1b$, and $S2b$ by performing the following operations:

$S1r=Cy+G$, $S2r=Ye+Mg$ $S1b=Cy+Mg$, $S2b=Ye+G$ based on Cy (cyan), Ye (yellow), G (green), and Mg (magenta) of each pixel data in a signal whose horizontal and vertical spatial phases are synchronized in the spatial phase synchronization means.

5. An image pickup apparatus according to claim 1, wherein the image pickup element is read on a frame basis by independently scanning odd-numbered and even-numbered lines.

6. An image pickup method for an image pickup apparatus provided with an image pickup element having a color coding filter, wherein the image pickup method comprises:
   the step of generating output signals by use of a generating means based on output from each line in the image pickup element and outputting the same;
   the step of allowing spatial phase synchronization means to synchronize horizontal and vertical spatial phases based on the output from each line in the image pickup element;
   the step of allowing synthesis means to create a synthesized signal based on a signal whose horizontal and vertical spatial phases are synchronized in the spatial phase synchronization means;
   the step of performing brightness processing on the outputted signals obtained from the means for generating signals; and
   the step of performing chromaticness processing for a signal from the synthesis means,
      wherein said outputted signals are delay signals sent to a preprocessing circuit containing a plurality of adders which compiles a sum of said delay signals and a ½ multiplier which halves the sum compiled from said plurality of adders,
      wherein said preprocessing circuit outputs said sum halved by said ½ multiplier to said step of performing brightness processing, and
      wherein said preprocessing circuit sends said delay signals as the signal from the synthesis means to said step of performing chromaticness processing.

7. An image pickup method according to claim 6, wherein the color coding filter is a complementary mosaic color coding filter.

8. An image pickup method according to claim 7, wherein the complementary mosaic color coding filter is based on a repetition of two pixels horizontally by four lines vertically, and wherein the filter comprises:
   a first line which is an alternate repetition of Cy (cyan) and Ye (yellow);
   a second line which is an alternate repetition of G (green) and Mg (magenta);
   a third line which is an alternate repetition of Cy and Ye; and
   a fourth line which is an alternate repetition of Mg and G.

9. An image pickup method according to claim 7, wherein the synthesis means generates new signals $S1r$, $S2r$, $S1b$, and $S2b$ by performing the following operations:

$S1r=Cy+G, S2r=Ye+Mg$ $S1b=Cy+Mg, S2b=Ye+G$ based on Cy (cyan), Ye (yellow), G (green), and Mg (magenta) of each pixel data in a signal whose horizontal and vertical spatial phases are synchronized in the spatial phase synchronization means.

10. An image pickup method according to claim 6, wherein the image pickup element is read on a frame basis by independently scanning odd-numbered and even-numbered lines.

* * * * *